Nov. 24, 1970  G. E. GRUBER  3,542,982
BIN LEVEL INDICATOR WITH INSERTABLE PADDLE
Filed Dec. 9, 1968
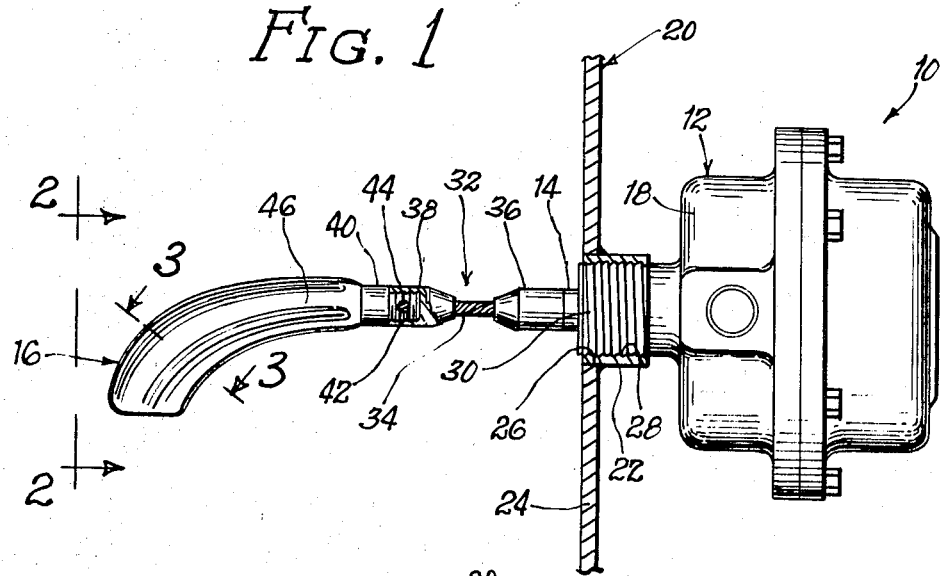
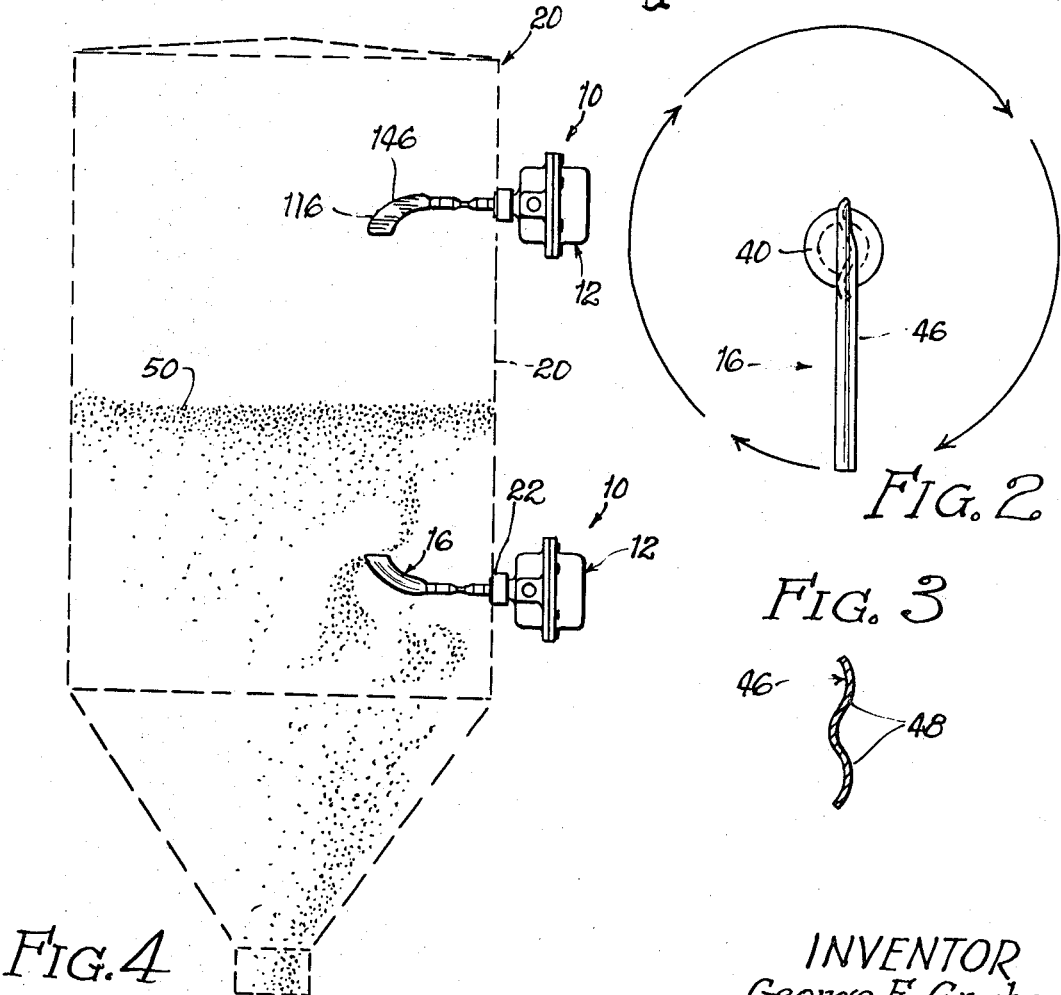
INVENTOR
George E. Gruber
by Burmeister, Palmatier & Hamby
Att'ys United States Patent Office 3,542,982
Patented Nov. 24, 1970

1

3,542,982
BIN LEVEL INDICATOR WITH
INSERTABLE PADDLE
George E. Gruber, Port Sanilac, Mich., assignor to Monitor Mfg., Inc., Minden City, Mich., a corporation of Michigan
Filed Dec. 9, 1968, Ser. No. 782,125
Int. Cl. H01h 35/00
U.S. Cl. 200—61.21                                    6 Claims

ABSTRACT OF THE DISCLOSURE

The bin level indicator is of the rotary type having a rotatable paddle adapted to engage granular material in a bin or the like. The bin level indicator detects the drag which the material causes on the rotating paddle. The indicator includes a housing which screws into a threaded bushing which is welded or otherwise secured to the wall of the bin. The paddle is sword-shaped and extends axially from the rotary shaft of the indicator and then curves outwardly as the paddle increases in width. The shape and width of the paddle are such that the paddle can be inserted into the bin through the threaded bushing so that it is not necessary to enter the bin to install the paddle. Preferably, the paddle is formed with longitudinal corrugations which stiffen and reinforce the paddle. The corrugations also provide a greater surface area without any increase in the overall width of the paddle.

---

This invention relates to bin level indicators which are adapted for carrying out various signaling and control functions in response to changes in the level of granular or other flowable material in a bin or the like. Such bin level indicators are employed, for example, to control the conveyors and other machinery used in filling and emptying a bin, so that the material will be maintained at the desired level in the bin. In a system of this kind, the bin level indicators prevent the bin from becoming empty and also prevent overfilling of the bin.

The present invention relates in particular to bin level indicators of the general type disclosed in the Lenhart Pat. No. 2,116,075, patented May 3, 1938. A bin level indicator of this type employs a motor which drives a paddle wheel or the like, adapted to engage the granular material in the bin when the material rises to the level at which the wheel is located. The drag of the material on the paddle wheel causes the motor to develop additional torque, which is sensed by a switch or some other sensing element. The switch is then employed to carry out various signaling and control functions. For example, the switch may be employed to shut off the conveyor which is filling the bin. The switch may also be employed to operate electric lamps, horns, and other warning devices. In the bin level indicator of the Lenhart patent, the switch is also employed to de-energize the motor so that will not be heated unnecessarily when it is stalled by the engagement of the material with the paddle wheel. In other bin level indicators, the motor is not de-energized but is allowed to remain energized in a stalled condition.

One object of the present invention is to provide a new and improved bin level indicator in which the rotary paddle can be mounted on the bin level indicator before the indicator is mounted on the bin. The paddle can then be inserted into the bin from the outside. Finally, the bin level indicator is mounted on the bin. Thus, it is not necessary to enter the bin to install the paddle. This has been necessary with many prior bin level indicators. In other instances it has been necessary to provide a large mounting plate, fitting over a large hole in the wall of the bin, to provide for insertion of the paddle from the outside. On the other hand, the bin level indicator of the present invention is mounted in a small bushing which may be welded or otherwise secured to the wall of the bin. Preferably, the bin level indicator screws into the bushing. A half length pipe coupling with standard internal pipe threads may be employed for the bushing.

Preferably, the paddle is in the shape of a curved sword. Thus, the paddle extends axially from the rotary shaft of the indicator, and then curves outwardly while it flares in width. The width and curvature of the paddle are limited so that the paddle can be inserted through the bushing. It is preferred to form the paddle with longitudinal corrugations or ribs which stiffen and reinforce the paddle. Moreover, the corrugations increase the surface area of the paddle, to provide greater contact with the granular material, while avoiding any increase in overall width.

Further objects and advantages of the present invention will appear from the following description, taken with the accompanying drawings, in which:

FIG. 1 is an elevation view, partly in section, showing a bin level indicator to be described as an illustrative embodiment of the present invention.

FIG. 2 is a fragmentary end view, taken generally as indicated by the line 2—2 in FIG. 1.

FIG. 3 is a section taken through the paddle, generally along the line 3—3 in FIG. 1.

FIG. 4 is a diagrammatic elevational view, showing the bin level indicator in its position of use on the wall of a bin, while also showing a second bin level indicator of a modified construction.

As just indicated, FIG. 1 illustrates a bin level indicator 10 of the general type disclosed in the above mentioned Lenhart Pat. No. 2,116,075. The bin level indicator 10 comprises a motor unit 12 which has a rotatable drive shaft 14 to which a rotary paddle 16 may be connected. The shaft 14 is rotatably mounted in a housing 18.

During normal operation, the shaft 14 and the paddle 16 are continuously rotated by the motor unit 12. The paddle 16 extends into a bin 20 or some other container, adapted to hold a granular or loose material. When the granular material rises to the level of the rotating paddle 16, the material imposes a drag upon the paddle. This drag or torque reaction is detected by the motor unit 12 which operates a switch or otherwise generates a signal which can be employed for various control purposes. Thus, the signal can be employed to start or stop a conveyor, or some other feeding device, or to operate electric lamps, horns and other warning devices.

The illustrated bin level indicator 10 is supported by a bushing 22 which is mounted on one wall 24 of the bin, in alignment with an opening 26 therein. In this case, the bushing 22 is mounted directly in the opening 26, flush with the inside of the wall 24. The bushing 22 is welded or otherwise secured to the wall 24.

Preferably, the bushing 22 is formed with internal threads 28 so that the bin level indicator may be screwed into the bushing. It will be seen that the bin level indicator 10 has an externally threaded mounting stub 30 which extends axially from the housing 18 and is adapted to be screwed into the bushing 22.

For convenience, the bushing 22 preferably takes the form of a half length pipe coupling. Such half couplings are available as stock items or may be produced by cutting an ordinary coupling in half. It is preferred to employ a half coupling intended for use with 1¼ inch pipe. The mounting stub 30 is correspondingly threaded.

In the illustrated bin level indicator 10, a flexible coupling 32 is connected between the shaft 14 and the paddle 16. However, the paddle 16 may be directly connected to the shaft, if desired. The coupling 32 comprises a flexible spring member 34 extending between inner and outer end fittings 36 and 38. The inner end fitting 36 is connected to the rotatable shaft 14. It will be seen that the paddle 16 is connected to the outer end fitting 38.

The illustrated paddle 16 has a hub or end fitting 40, adapted to be connected to the flexible coupling 32, or directly to the shaft 14. As shown, the hub 40 has a reduced, externally threaded end portion 42 which screws into the end fitting 38 on the flexible coupling 32. A locking pin 44 may be inserted through suitable openings in the end fitting 38 and the threaded end portion 42.

The paddle 16 preferably comprises a single blade 46 secured to the hub 40. The blade 46 is preferably made of sheet metal. It may advantageously be coated with Teflon plastic or some other wear resistant material.

The blade 46 is preferably in the shape of a curved sword. Thus, the blade 46 extends axially from the hub 40 and then curves outwardly in a radial direction. The blade 46 is relatively narrow where it is secured to the hub 40, but increases in width as it curves outwardly. The sword-shaped blade has the advantage that the width and curvature of the blade may be limited so that the blade will pass freely through the mounting bushing 22.

Thus, the bin level indicator 10 can be installed very easily by mounting the paddle 16 on the shaft 14, and then inserting the paddle through the bushing 22. The threaded mounting stub 30 is then screwed into the bushing 22.

If necessary, the entire bin level indicator 10 can be removed from the bin by unscrewing the threaded stub 30 from the bushing 22. The shaft 14, the flexible coupling 32, and the paddle 16 can then be withdrawn from the bin through the bushing 22. It will be evident that the bin level indicator, complete with the paddle, can be installed and removed without any necessity for entering the bin to mount the paddle on the bin level indicator.

Preferably, the sword-shaped blade 46 is formed with a plurality of longitudinal corrugations or ribs 48 which stiffen and reinforce the blade. The corrugations also increase the surface area of the blade, so that the blade will have increased contact with the granular material in the bin. This increase in the surface area of the blade is achieved without any increase in overall width. The strength of the blade is greatly increased by the provision of the corrugations 48.

FIG. 4 illustrates two of the bin level indicators 10 in a typical installation on the bin 20. The lower bin level indicator serves as a low level indicator. Thus, its paddle 16 is normally in contact with the granular material 50 in the bin 20. When the level of the granular material 50 falls below the lower paddle 16, the lower indicator 10 operates an alarm or changes the operation of a feeder so that the granular material 50 will rise to a higher level in the bin.

As shown in FIG. 4, the upper bin level indicator 10 has a slightly modified paddle 116 in which the corrugations 48 are omitted, so that the blade 146 of the paddle 116 is flat. Otherwise, the paddle 116 is the same as the paddle 16.

The upper bin level indicator provides a high level indication. Thus, the paddle 116 is normally above the level of the granular material 50. When the granular material 50 rises sufficiently to engage the paddle 116, the upper bin level indicator 10 operates an alarm or changes the operation of a feeder device so as to cause the level of the granular material to drop in the bin 20.

If it becomes necessary to service the bin level indicator 10, the threaded mounting stub 30 may simply be unscrewed from the bushing 22. The curved sword-shaped blade 46 of the paddle 16 can readily be withdrawn through the bushing 22, so that there is never any need to go into the bin to remove the paddle. Likewise, the bin level indicator 10 can be reinstalled by mounting the paddle 16 on the shaft 14, inserting the paddle through the bushing 22, and screwing the mounting stub 30 into the bushing 22.

When the bin level indicator is first installed in a new location, it is an easy matter to cut the hole 26, insert the bushing 22, and weld the bushing to the wall 24 of the bin 20. There is no possibility of leakage of the granular material between the bushing and the wall of the bin. Such problems with leakage have been encountered with mounting plates of the prior art, adapted to be bolted to the bin wall. The insertable paddle of the present invention makes it very easy to install and remove the bin level indicator.

Various other modifications, alternative constructions and equivalents may be employed, as will be understood by those skilled in the art.

I claim:
1. A bin level indicator,
comprising a motor unit having a generally cylindrical mounting stub,
said motor unit having a drive shaft rotatably mounted in said mounting stub,
a mounting bushing for removably receiving said mounting stub,
and an insertable paddle connected to said shaft and having a curved sword-shaped blade insertable through said bushing,
whereby said paddle can be mounted on said shaft and inserted through said bushing before said mounting stub is mounted in said bushing.

2. A bin level indicator according to claim 1, in which said paddle has an end fitting for supporting said sword-shaped blade,
said blade extending axially from said end fitting and curving outwardly generally in a radial plane,
the overall width and curvature of said blade being limited to allow for insertion of said blade through said bushing.

3. A bin level indicator according to claim 2, in which said blade flares outwardly in width from said end fitting.

4. A bin level indicator according to claim 1, in which said blade is formed with longitudinal corrugations.

5. A bin level indicator according to claim 1, in which said blade flares outwardly in width from said shaft.

6. A bin level indicator according to claim 1, in which said bushing is internally threaded, said mounting stub being externally threaded for reception in said bushing.

References Cited
UNITED STATES PATENTS

| | | | |
|---|---|---|---|
| 1,714,515 | 5/1929 | Middelboe | 200—61.21 XR |
| 2,121,651 | 6/1938 | Claytor | 200—81.9 |
| 2,698,362 | 12/1954 | Bozich | 200—61.21 |

ROBERT K. SCHAEFER, Primary Examiner

M. GINSBURG, Assistant Examiner